US012625305B2

(12) United States Patent
Joo et al.

(10) Patent No.:    US 12,625,305 B2
(45) Date of Patent:        May 12, 2026

(54) DISPLAY DEVICE

(71) Applicant: Samsung Display Co., LTD., Yongin-si (KR)

(72) Inventors: Sun-Kyu Joo, Yongin-si (KR); Sangji Park, Yongin-si (KR); Jae Cheol Park, Yongin-si (KR); Keunchan Oh, Yongin-si (KR); Dokyung Youn, Yongin-si (KR); Songee Lee, Yongin-si (KR); Woo-Man Ji, Yongin-si (KR); Tae Hyung Hwang, Yongin-si (KR)

(73) Assignee: SAMSUNG DISPLAY CO., LTD., Gyeonggi-Do (KR)

( * ) Notice:      Subject to any disclaimer, the term of this patent is extended or adjusted under 35 U.S.C. 154(b) by 390 days.

(21) Appl. No.: 18/358,581

(22) Filed:     Jul. 25, 2023

(65)             Prior Publication Data

US 2024/0142678 A1      May 2, 2024

(30)          Foreign Application Priority Data

Oct. 31, 2022     (KR) ......................... 10-2022-0142219

(51) Int. Cl.
  *G02B 5/20*          (2006.01)
  *G02F 1/01*          (2006.01)
(52) U.S. Cl.
  CPC ........... *G02B 5/206* (2013.01); *G02F 1/0107* (2013.01); *G02F 2203/03* (2013.01)
(58) Field of Classification Search
  CPC ............... G02F 1/01791; G02F 1/0107; G02F 2203/03; G02B 5/206
  See application file for complete search history.

(56)                References Cited

U.S. PATENT DOCUMENTS

| | | |
|---|---|---|
| 10,364,391 B2 | 7/2019 | Jang et al. |
| 2020/0075682 A1 | 3/2020 | Jeong et al. |

(Continued)

FOREIGN PATENT DOCUMENTS

| | | |
|---|---|---|
| JP | 2021-117249 | 8/2021 |
| KR | 20160000811 A | 1/2016 |
| KR | 10-2017-0039064 | 4/2017 |

(Continued)

OTHER PUBLICATIONS

Office Action dated Mar. 26, 2026 from the Korean Intellectual Property Office (KIPO) for Korean Patent Application No. 10-2022-0142219, 19 pages, w/English-translation.

*Primary Examiner* — Joseph P Martinez
(74) *Attorney, Agent, or Firm* — CANTOR COLBURN LLP

(57)                ABSTRACT

A display device includes a display unit including a lower substrate and first, second, and third light emitting elements disposed on the lower substrate, a color filter unit including an upper substrate having a lower surface facing the first, second, and third light emitting elements, a filler disposed between the display unit and the color filter unit and including a wavelength conversion particle. The color filter unit further includes a color filter layer including first, second, and third color filters disposed on the lower surface of the upper substrate, a bank layer disposed below the color filter layer and including first, second, and third openings, a first column spacer filling the first opening, and a second column spacer filling the second opening.

20 Claims, 7 Drawing Sheets

(56)            References Cited

U.S. PATENT DOCUMENTS

2020/0091464 A1      3/2020  Park et al.
2022/0199692 A1*    6/2022  Jang ...................... G02B 5/207

FOREIGN PATENT DOCUMENTS

| KR | 20200025980 A | 3/2020 |
| KR | 20200032294 A | 3/2020 |
| KR | 10-2021-0158461 | 12/2021 |

* cited by examiner

PX:PX1,PX2,PX3

LED1:PE1,EML1,CE1
LED2:PE2,EML2,CE2
LED3:PE3,EML3,CE3
CF:CF1,CF2,CF3

F I G. 4
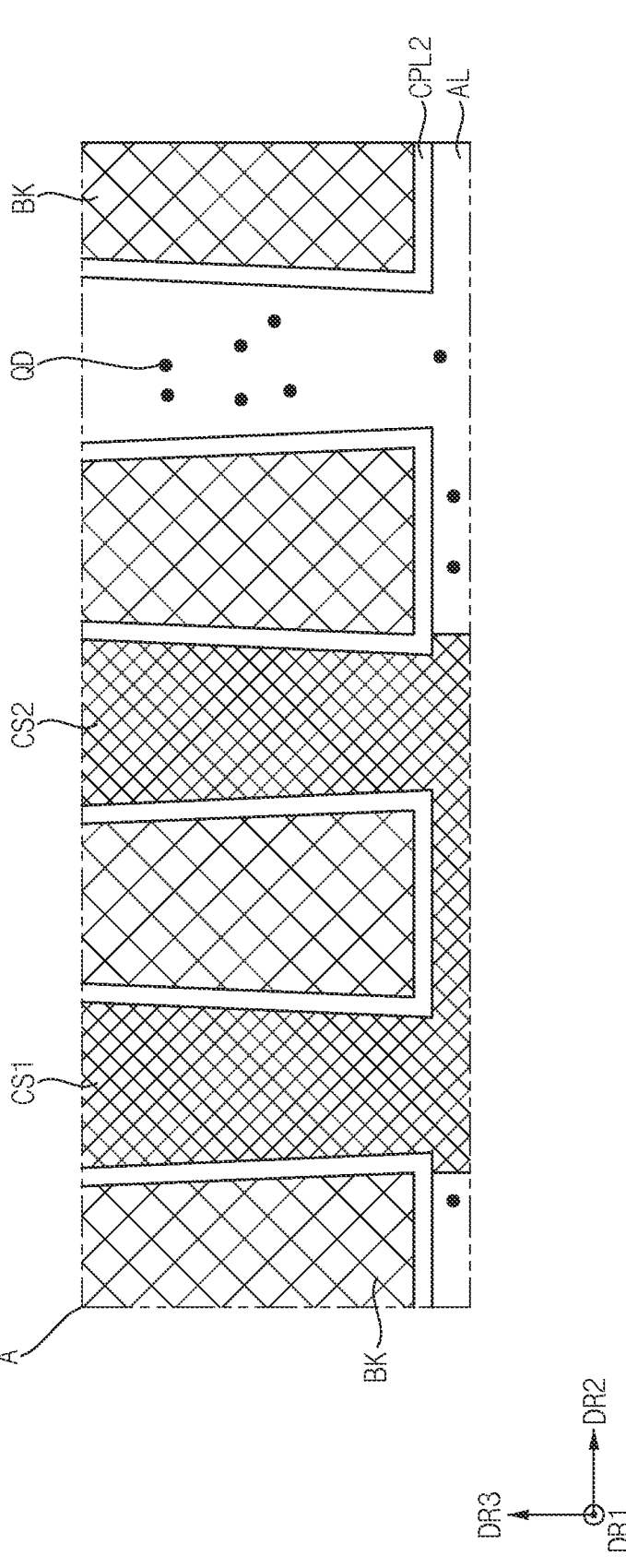

F I G. 5
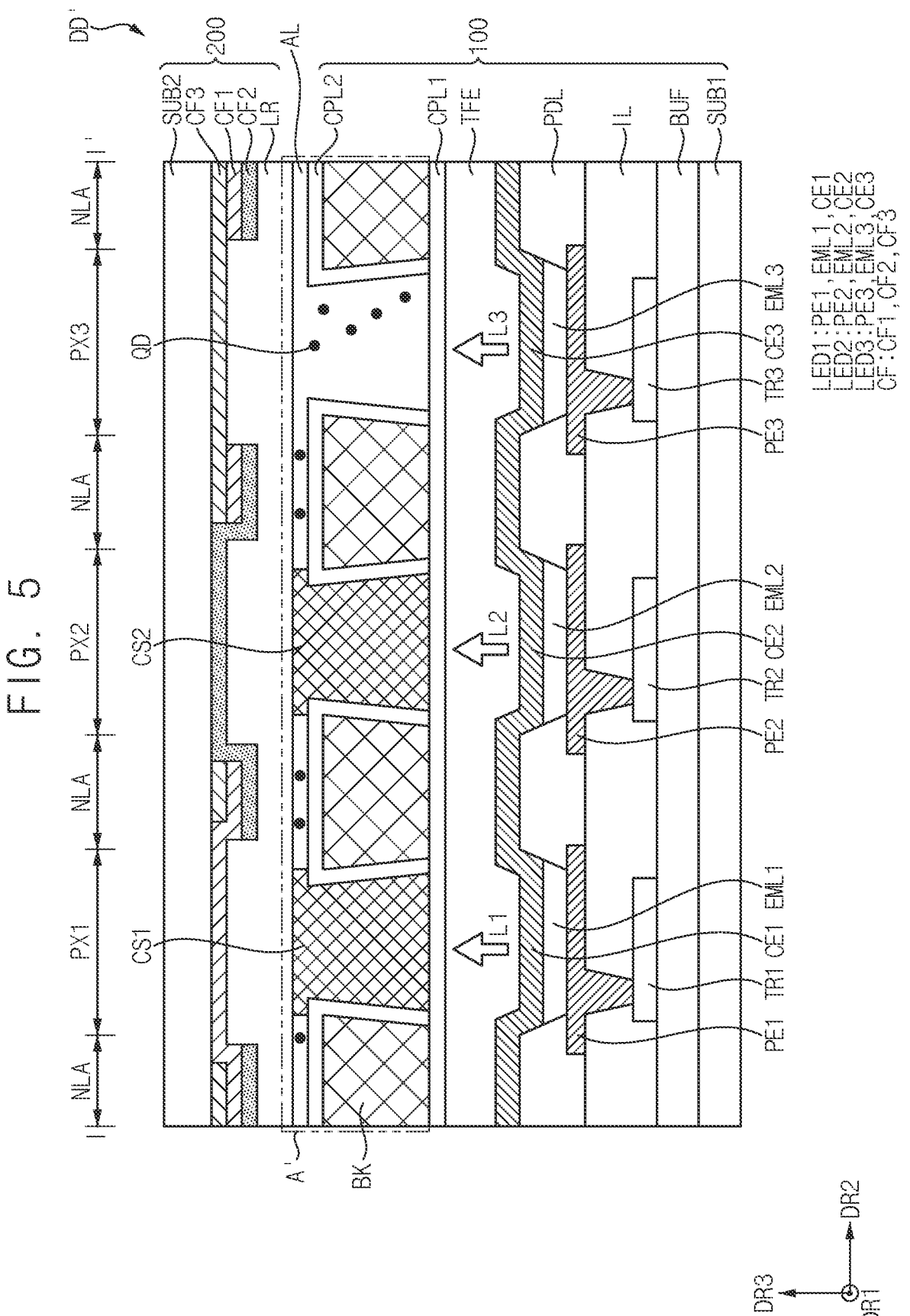
LED1:PE1, EML1, CE1
LED2:PE2, EML2, CE2
LED3:PE3, EML3, CE3
CF:CF1, CF2, CF3

F I G. 6

F I G. 7
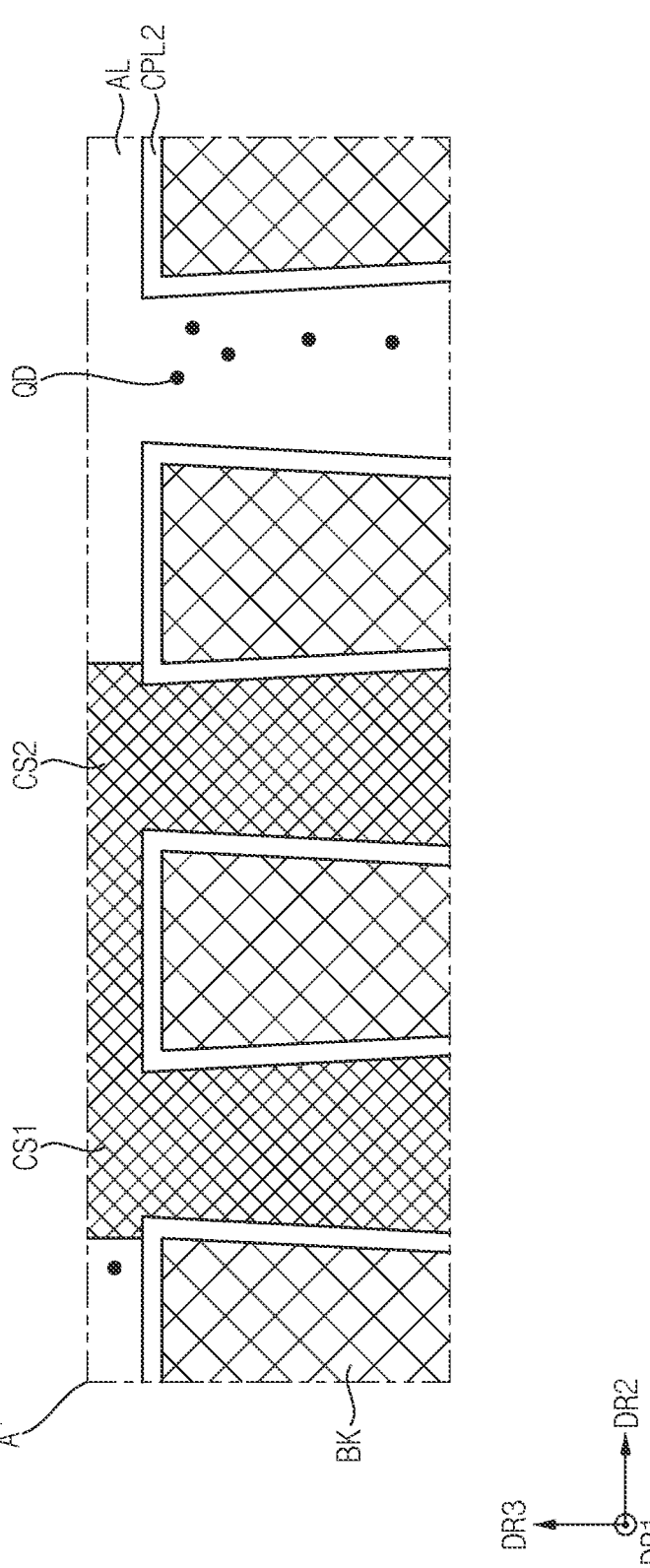

DISPLAY DEVICE

CROSS-REFERENCE TO RELATED APPLICATION(S)

This application claims priority to and benefits of Korean Patent Application No. 10-2022-0142219 under 35 U.S.C. § 119, filed on Oct. 31, 2022, in the Korean Intellectual Property Office (KIPO), the entire contents of which are incorporated herein by reference.

BACKGROUND

1. Technical Field

Embodiments relate to a display device for providing visual information.

2. Description of the Related Art

The display device is a device that displays an image for providing visual information to a user. Representative examples of such a display device include a liquid crystal display device and an organic light emitting display device.

Recently, in order to improve display quality, a display device including a display substrate including multiple pixels and a color conversion substrate including a color filter layer and a color conversion layer has been proposed. The color conversion layer may convert a wavelength of light provided from the display substrate. Accordingly, the display device including the color conversion layer may emit light having a color different from that of incident light. For example, the color conversion layer may include wavelength conversion particles such as quantum dots.

SUMMARY

Embodiments provide a display device with improved reliability.

A display device according to an embodiment may include a display unit including a lower substrate and a first light emitting element, a second light emitting element, and a third light emitting element disposed on the lower substrate, a color filter unit including an upper substrate having a lower surface facing the first, second, and third light emitting elements, and a filler disposed between the display unit and the color filter unit and including a wavelength conversion particle. The color filter unit may include a color filter layer including a first color filter, a second color filter, and a third color filter disposed on the lower surface of the upper substrate, a bank layer disposed below the color filter layer and including a first opening, a second opening, and a third opening, a first column spacer filling the first opening, and a second column spacer filling the second opening.

In an embodiment, the wavelength conversion particle may include quantum dots emitting first color light.

In an embodiment, the first color light may be red light.

In an embodiment, the filler may fill the third opening.

In an embodiment, a lower surface of the first column spacer and a lower surface of the second column spacer may be formed lower than a lower surface of the bank layer.

In an embodiment, the first column spacer and the second column spacer may be connected to each other.

In an embodiment, the first color filter and the second color filter may include a scattering element.

In an embodiment, the display device may further include a low refractive layer disposed between the color filter layer and the bank layer, the first column spacer, the second column spacer, and the filler.

In an embodiment, the display device may further include a first capping layer disposed between the low refractive layer and the bank layer, the first column spacer, the second column spacer, and the filler.

In an embodiment, the display device may further include a second capping layer covering a lower surface of the bank layer and sidewalls of the first opening, the second opening, and the third opening.

In an embodiment, each of the first column spacer and the second column spacer may include a liquid repellent component.

A display device according to an embodiment may include a display unit including a lower substrate and a first light emitting element, a second light emitting element, and a third light emitting element disposed on the lower substrate, a color filter unit including an upper substrate having a lower surface facing the first, second, and third light emitting elements, and a filler disposed between the display unit and the color filter unit and including a wavelength conversion particle. The display unit may further include a bank layer disposed on the first, second, and third light emitting elements and including a first opening, a second opening, and a third opening, a first column spacer filling the first opening, and a second column spacer filling the second opening. The color filter unit may further include a color filter layer including a first color filter, a second color filter, and a third color filter disposed on the lower surface of the upper substrate.

In an embodiment, the wavelength conversion particle may include quantum dots emitting first color light.

In an embodiment, the first color light may be red light.

In an embodiment, the filler may fill the third opening.

In an embodiment, an upper surface of the first column spacer and an upper surface of the second column spacer may be formed higher than an upper surface of the bank layer.

In an embodiment, the first column spacer and the second column spacer may be connected to each other.

In an embodiment, the display device may further include an encapsulation layer disposed between the bank layer and the first to third light emitting elements, the first column spacer, the second column spacer, and the filler.

In an embodiment, the display device may further include a first capping layer disposed between the encapsulation layer and the bank layer, the first column spacer, the second column spacer, and the filler.

In an embodiment, the display device may further include a second capping layer covering an upper surface of the bank layer and sidewalls of the first opening, the second opening, and the third opening.

A display device according to an embodiment may include a display unit including a lower substrate and a first light emitting element, a second light emitting element, and a third light emitting element disposed on the lower substrate, a color filter unit including an upper substrate having a lower surface facing the first, second, and third light emitting elements, and a filler disposed between the display unit and the color filter unit and including a wavelength conversion particle. The color filter unit may further include a color filter layer including a first color filter, a second color filter, and a third color filter disposed on the lower surface of the upper substrate, a bank layer disposed below the color filter layer and including a first opening, a second opening, and a third opening, a first column spacer filling the first opening, and a second column spacer filling the second opening.

Accordingly, a process of depositing a color conversion layer including quantum dots emitting green light and blue light through an inkjet process may be omitted. As the resolution of the display device increases, the size of the openings into which the color conversion layer including quantum dots is injected may decrease. Therefore, as the resolution of the display device increases, the process of depositing the color conversion layer through the inkjet process may become more difficult. Instead of this inkjet process, green light and blue light may be expressed through color filters, and red light may be expressed through color filters and red light quantum dots included in the filler to form a panel structure suitable for high-resolution display device.

BRIEF DESCRIPTION OF THE DRAWINGS

Illustrative, non-limiting embodiments will be more clearly understood from the following detailed description in conjunction with the accompanying drawings.

FIG. 4 is a schematic cross-sectional view of area A of FIG. 2 according to an embodiment.

FIG. 5 is a schematic cross-sectional view illustrating a display device according to another embodiment.

FIG. 6 is a schematic cross-sectional view of region A' of FIG. 5 according to an embodiment.

FIG. 7 is a schematic cross-sectional view of region A' of FIG. 5 according to an embodiment.

DETAILED DESCRIPTION OF THE EMBODIMENTS

Figure 1:
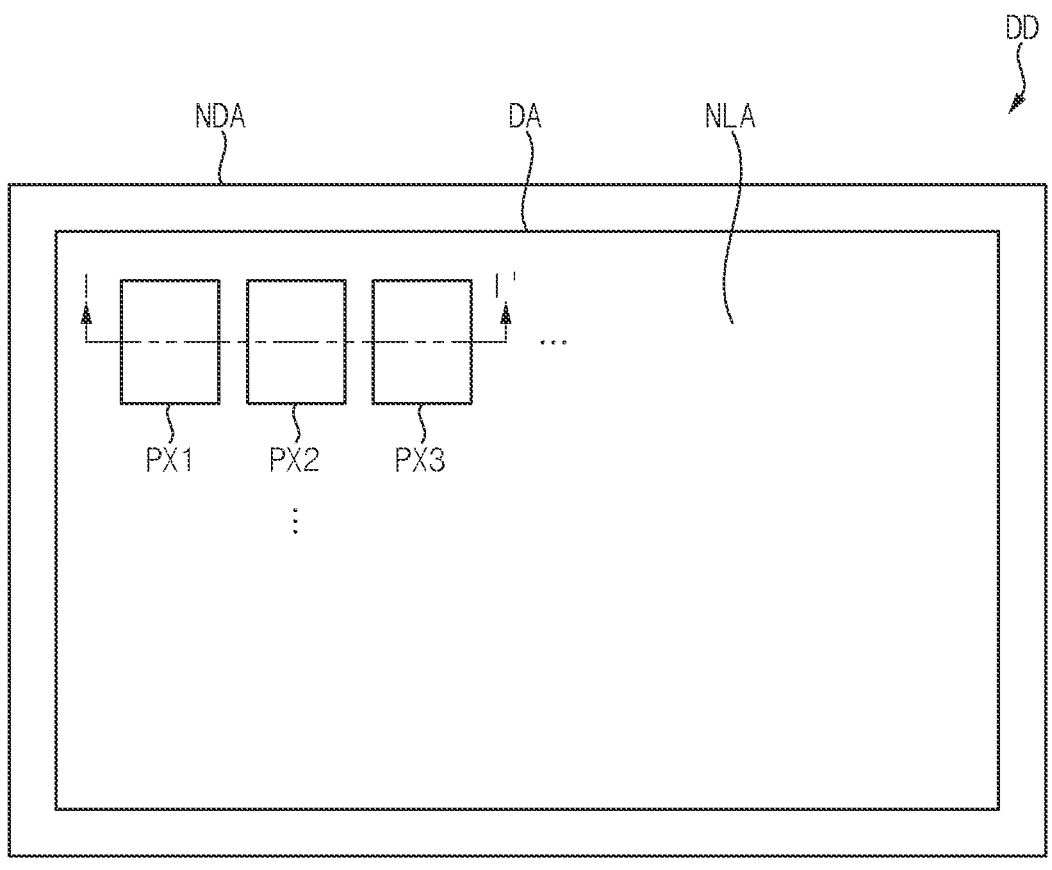
FIG. 1 is a plan view illustrating a display device according to an embodiment.
Figure 1:

Hereinafter, display devices in accordance with embodiments will be described in more detail with reference to the accompanying drawings. The same reference numerals are used for the same components in the drawings, and redundant descriptions of the same components will be omitted.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2:
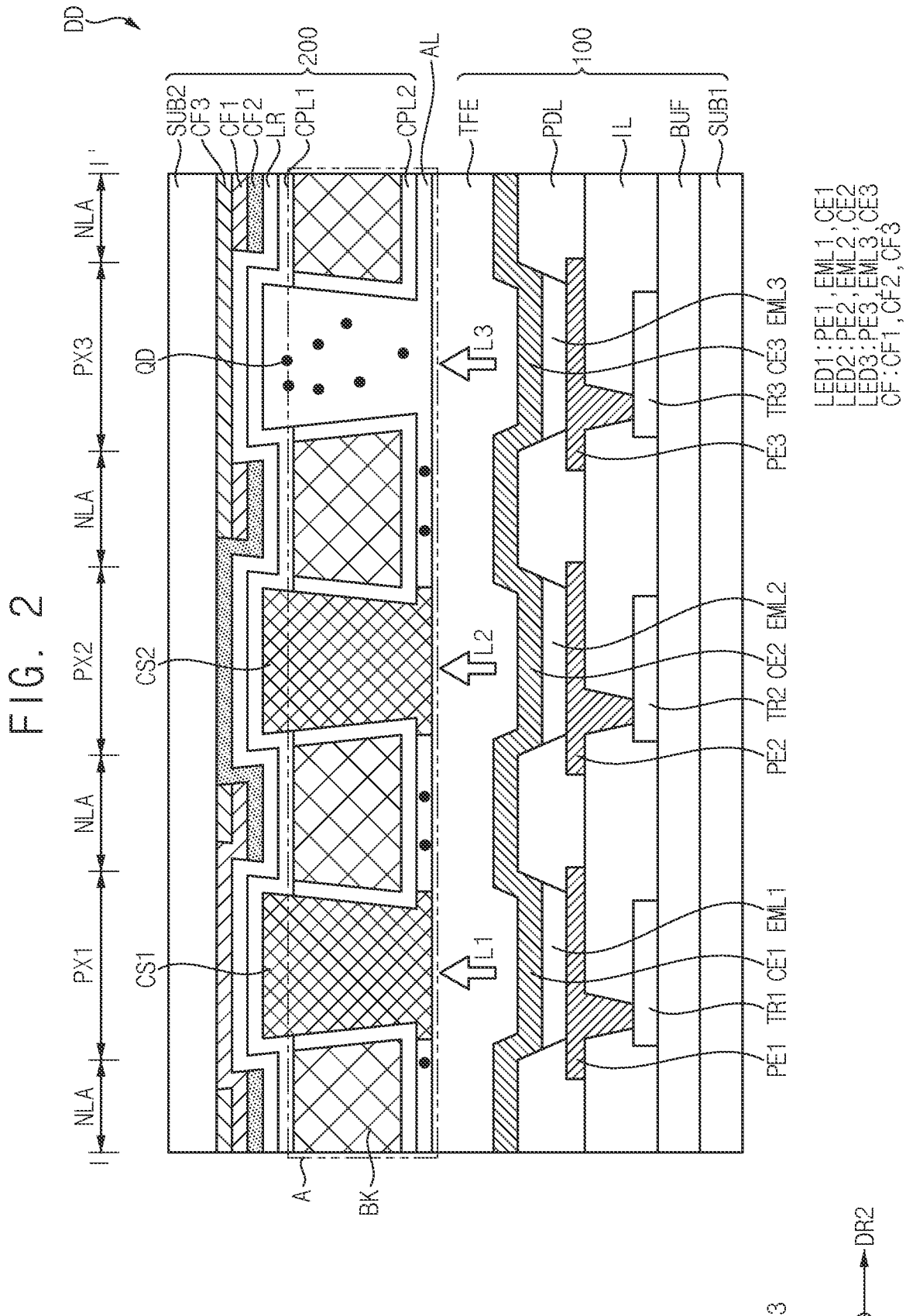
FIG. 2 is a schematic cross-sectional view taken along line I-I' of FIG. 1.

FIG. 1 is a plan view illustrating a display device according to an embodiment. FIG. 2 is a schematic cross-sectional view taken along line I-I' of FIG. 1.

Referring to FIG. 1, a display device DD may include a display area DA and a non-display area NDA. The display area DA may be defined as an area emitting light, and the non-display area NDA may be defined as an area in which components for transmitting signals to the display area DA are disposed.

Multiple pixels PX may be disposed in the display area DA. The pixels PX may include a first pixel PX1, a second pixel PX2, and a third pixel PX3. Each of the first pixel PX1, the second pixel PX2, and the third pixel PX3 may be an area in which light emitted from a light emitting element is emitted to the outside of the display device DD.

For example, the first pixel PX1 may emit first light, the second pixel PX2 may emit second light, and the third pixel PX3 may emit third light. In an embodiment, the first light may be blue light, the second light may be green light, and the third light may be red light. However, the disclosure is not limited thereto.

The pixels PX may be repeatedly arranged in a first direction DR1 and a second direction DR2 intersecting the first direction DR1 in a plan view. For example, the second pixel PX2 may be disposed adjacent to the first pixel PX1. For example, the second pixel PX2 may be disposed adjacent to the first pixel PX1 in the second direction DR2.

The non-display area NDA may be located adjacent to the display area DA. For example, the non-display area NDA may surround at least a portion of the display area DA. A driving unit may be disposed in the non-display area NDA. The driving unit may provide signals or voltages to the pixels PX. For example, the driving unit may include a data driving unit, a gate driving unit, or the like. The non-display area NDA may not display an image.

In the specification, a plane may be defined by a first direction DR1 and a second direction DR2 crossing the first direction, and for example, the first direction DR1 and the second direction DR2 may be perpendicular to each other. A third direction DR3 may be perpendicular to each of the first direction DR1 and the second direction DR2.

The display device DD of the disclosure may include an organic light emitting display device (OLED), a liquid crystal display device (LCD), a field emission display device (FED), a plasma display device (PDP), an electrophoretic display device (EPD), an inorganic light emitting display device (ILED), or the like.

Referring to FIG. 2, the display device DD according to an embodiment of the disclosure may include a display unit 100, a color filter unit 200, and a filler AL. The display unit 100 may include a lower substrate SUB1, a buffer layer BUF, an insulating layer IL, a pixel defining layer PDL, an encapsulation layer TFE, a first pixel electrode PE1, a first light emitting layer EML1, a first common electrode CE1, a second pixel electrode PE2, a second light emitting layer EML2, a second common electrode CE2, a third pixel electrode PE3, a third light emitting layer EML3, a third common electrode CE3, a first transistor TR1, a second transistor TR2, and a third transistor TR3.

The first transistor TR1 may include a first active pattern, a first gate electrode, a first source electrode, and a first drain electrode. The second transistor TR2 may include a second active pattern, a second gate electrode, a second source electrode, and a second drain electrode. The third transistor TR3 may include a third active pattern, a third gate electrode, a third source electrode, and a third drain electrode.

A lower substrate SUB1 may include a transparent material or an opaque material. The lower substrate SUB1 may be formed of a transparent resin substrate. In an embodiment, the lower substrate SUB1 may be a polyimide substrate, and the polyimide substrate may include a first organic layer, a first barrier layer, a second organic layer, or the like.

In an embodiment, the lower substrate SUB1 may be a quartz substrate, a synthetic quartz substrate, a calcium fluoride substrate, a fluorine-doped quartz substrate, a soda lime substrate, a non-alkali glass substrate, or the like. These materials may be used alone or in combination with each other.

A buffer layer BUF may be disposed on the lower substrate SUB1. The buffer layer BUF may prevent metal atoms or impurities from being diffused from the lower substrate SUB1 to the first, second, and third transistors TR1, TR2, TR3. The buffer layer BUF may improve the flatness of the surface of the lower substrate SUB1 in case that the surface of the lower substrate SUB1 is not uniform.

For example, the buffer layer BUF may include an inorganic material such as silicon oxide, silicon nitride, or silicon oxynitride. These materials may be used alone or in combination with each other.

The first to third transistors TR1, TR2, TR3 may be disposed on the buffer layer BUF. For example, the first to third transistors TR1, TR2, TR3 may include polycrystalline silicon or a metal oxide semiconductor.

The metal oxide semiconductor may include a binary compound ($AB_x$), a ternary compound ($AB_xC_y$), a quaternary compound ($AB_xC_yD_z$), and the like including indium (In), zinc (Zn), gallium (Ga), tin (Sn), titanium (Ti), aluminum (Al), hafnium (Hf), zirconium (Zr), magnesium (Mg), or the like.

For example, the metal oxide semiconductor may include zinc oxide ($ZnO_x$), gallium oxide ($GaO_x$), tin oxide ($SnO_x$), indium oxide ($InO_x$), indium gallium oxide (IGO), indium zinc oxide (IZO), indium tin oxide (ITO), indium zinc tin oxide (IZTO), indium gallium zinc oxide (IGZO), or the like. These materials may be used alone or in combination with each other.

An insulating layer IL may be disposed on the buffer layer BUF. The insulating layer IL may cover the first to third transistors TR1, TR2, TR3. The insulating layer IL may include at least one inorganic insulating layer and at least one organic insulating layer.

For example, the inorganic insulating layer may include silicon oxide ($SiO_x$), silicon nitride ($SiN_x$), silicon carbide ($SiC_x$), silicon oxynitride ($SiO_xN_y$), silicon oxycarbide ($SiO_xC_y$), or the like. These materials may be used alone or in combination with each other.

The organic insulating layer may include a photoresist, a polyacryl-based resin, a polyimide-based resin, a polyamide-based resin, a siloxane-based resin, an acryl-based resin, an epoxy-based resin, or the like. These materials may be used alone or in combination with each other.

A first pixel electrode PE1, a second pixel electrode PE2, and a third pixel electrode PE3 may be disposed in the first to third pixels PX1, PX2, PX3 on the insulating layer IL, respectively. The first to third pixel electrodes PE1, PE2, PE3 may be connected to the first to third transistors TR1, TR2, TR3 respectively through contact holes formed by removing a portion of the insulating layer TL.

For example, each of the first to third pixel electrodes PE1, PE2, PE3 may include a metal, an alloy, a metal nitride, a conductive metal oxide, a transparent conductive material, or the like. These materials may be used alone or in combination with each other. For example, the first to third pixel electrodes PE1, PE2, PE3 may operate as an anode.

A pixel defining layer PLD may be disposed in the non-light emitting area NLA on the insulating layer IL and the first to third pixel electrodes PE1, PE2, PE3. The pixel defining layer PLD may cover both sides of the first to third pixel electrodes PE1, PE2, PE3 and may expose top surfaces of the first to third pixel electrodes PE1, PE2, PE3.

The pixel defining layer PDL may include an organic material and/or an inorganic material. In an embodiment, the pixel defining layer PDL may include an organic material. For example, the pixel defining layer PDL may include a photoresist, a polyacrylic resin, a polyimide resin, a polyamide resin, a siloxane resin, an acrylic resin, an epoxy resin, or the like. These materials may be used alone or in combination with each other.

First to third light emitting layers EML1, EM2, EML3 may be disposed in the first to third pixels PX1, PX2, PX3 on the first to third pixel electrodes PE1, PE2, PE3 respectively. For example, holes provided by the first to third pixel electrodes PE1, PE2, PE3 and electrons provided by the first to third common electrodes CE1, CE2, CE3 may combine in the first to third light emitting layers EML1, EML2, EML3 to form excitons, and the excitons may change from excited state to ground state to emit light. In an embodiment, the first to third light emitting elements EML1, EM2, EML3 may emit green light. In an embodiment, the first to third light emitting elements EML1, EM2, EML3 may emit blue light. In an embodiment, the first to third light emitting elements EML1, EM2, EML3 may emit green light and blue light.

First to third common electrodes CE1, CE2, CE3 may be disposed on the first to third light emitting layers EML1, EML2, EML3 and the pixel defining layer PDL. For example, each of the first to third common electrodes CE1, CE2, CE3 may include a metal, an alloy, a metal nitride, a conductive metal oxide, a transparent conductive material, and the like. These materials may be used alone or in combination with each other. For example, the first to third common electrodes CE1, CE2, CE3 may operate as cathodes.

The first pixel electrode PE1, the first light emitting layer EML1, and the first common electrode CE1 may constitute a first light emitting element LED1. The second pixel electrode PE2, the second light emitting layer EML2, and the second common electrode CE2 may constitute the second light emitting element LED2. The third pixel electrode PE3, the third light emitting layer EML3, and the third common electrode CE3 may constitute a third light emitting element LED3.

An encapsulation layer TFE may be disposed on the first to third common electrodes CE1, CE2, CE3. The encapsulation layer TFE may prevent impurities, moisture, and the like from penetrating into the first to third light emitting elements LED1, LED2, LED3 from the outside. The encapsulation layer TFE may include at least one inorganic encapsulation layer and at least one organic encapsulation layer. For example, the inorganic encapsulation layer may include silicon oxide, silicon nitride, or silicon oxynitride, and the organic encapsulation layer may include a polymer cured material such as polyacrylate.

A color filter unit 200 may include a color filter layer CF including a first color filter CF1, a second color filter CF2, and a third color filter CF3, an upper substrate SUB2, a low refractive layer LR, a first column spacer CS1, a second column spacer CS2, a first capping layer CPL1, a second capping layer CPL2, and a bank layer BK.

An upper substrate SUB2 may include a transparent material. Examples of materials of the upper substrate SUB2 may include glass, plastic, and the like. The surface of the upper substrate SUB2 facing the first to third light emitting elements LED1, LED2, LED3 to be described below may be a lower surface.

A color filter layer CF may be disposed under the lower surface of the upper substrate SUB2. The color filter layer CF may include a first color filter CF1, a second color filter CF2, and a third color filter CF3.

In an embodiment, the first color filter CF1 may overlap the first pixel PX1 and may selectively transmit blue light. The second color filter CF2 may overlap the second pixel PX2 and may selectively transmit green light. The third color filter CF3 may overlap the third pixel PX3 and may selectively transmit red light. However, the disclosure is not limited thereto. For example, the first color filter CF1 may selectively transmit green light. The second color filter CF2 may selectively transmit blue light. The third color filter CF3 may selectively transmit red light.

In an embodiment, each of the first color filter CF1, the second color filter CF2, and the third color filter CF3 may be disposed in the non-light emitting area NLA. For example, as illustrated in FIG. 2, the first color filter CF1 may overlap the first pixel PX1 and the non-light emitting area NLA, and may not overlap the second and third pixels PX2, PX3 in a plan view. The second color filter CF2 may overlap the second pixel PX2 and the non-light emitting area NLA, and may not overlap the first and third pixels PX1, PX3 in a plan view. The third color filter CF3 may overlap the third pixel PX3 and the non-light emitting area NLA, and may not overlap the first and second pixels PX1, PX2 in a plan view.

Portions of the first color filter CF1, the second color filter CF2, and the third color filter CF3 may overlap with each other in the third direction DR3 in the non-light emitting area NLA. Accordingly, color mixing between the adjacent first to third pixels PX1, PX2, PX3 may be prevented.

In an embodiment, each of the first color filter CF1 and the second color filter CF2 may include a scattering element. The scattering element may increase light path by scattering the first and second incident light L1, L2 incident on the first color filter CF1 and the second color filter CF2, respectively, without substantially changing wavelengths of the first and second incident light L1, L2.

In an embodiment, the scattering element may include a metal oxide or an organic material. In an embodiment, the scattering element may include titanium dioxide (TiO$_2$).

A low refractive layer LR may be disposed under the color filter layer CF. In an embodiment, the low refractive layer LR may include an organic material. The low refractive layer LR may increase the luminance and life of the display device DD by improving light extraction efficiency.

A first capping layer CPL1 may be disposed under the low refractive layer LR. In an embodiment, the first capping layer CPL1 may cover the low refractive layer LR. In an embodiment, the first capping layer CPL1 may include an inorganic material. Examples of the inorganic material in the first capping layer CPL1 may include silicon oxide, silicon nitride, and the like. These materials may be used alone or in combination with each other.

A bank layer BK may be disposed under the first capping layer CPL1. The bank layer BK may include a first opening, a second opening, and a third opening overlapping the first pixel PX1, the second pixel PX2, and the third pixel PX3, respectively, in a plan view. For example, the bank layer BK entirely overlaps the non-light emitting area NLA and may have a matrix shape in a plan view.

The bank layer BK may include an organic material. In an embodiment, the bank layer BK may include a light blocking material. For example, the bank layer BK may include a black pigment, a black dye, carbon black, or the like.

A first column spacer CS1 may fill the first opening. For example, the first column spacer CS1 may be disposed at a portion overlapping the first pixel PX1 under the first capping layer CPL1.

A second column spacer CS2 may fill the second opening. For example, the second column spacer CS2 may be disposed at a portion overlapping the second pixel PX2 under the first capping layer CPL1.

In an embodiment, each of the first column spacer CS1 and the second column spacer CS2 may include a liquid repellent component. For example, the first column spacer CS1 and the second column spacer CS2 may include a fluorine-containing monomer, a fluorine-containing polymer, or the like. Accordingly, the first column spacer CS1 and the second column spacer CS2 may repel a wavelength conversion particle QD to be described below.

A second capping layer CPL2 may cover a lower surface of the bank layer BK and sidewalls of the first opening, the second opening, and the third opening. In an embodiment, the second capping layer CPL2 may include an inorganic material. Examples of the inorganic material in the second capping layer CPL2 may include silicon oxide, silicon nitride, and the like. These materials may be used alone or in combination with each other.

A filler AL may be disposed between the display unit 100 and the color filter unit 200. For example, the filler AL may serve to bond the display unit 100 and the color filter unit 200. In an embodiment, the filler AL may fill the third opening. For example, the filler AL may not fill the first opening and the second opening.

The first column spacer CS1 and the second column spacer CS2 may have a width greater than a width of the bank layer BK in the third direction. Accordingly, the filler AL may be disposed under the bank layer BK.

The filler AL may include a wavelength conversion particle QD. The wavelength conversion particle QD may be disposed in the filler AL. The wavelength conversion particle QD may include a quantum dot. The quantum dot may absorb the third incident light L3 and emit light having a wavelength different from the wavelength of the third incident light L3. In an embodiment, the wavelength conversion particle QD may absorb the third incident light L3 to emit red light.

The red light emitted from the wavelength conversion particle QD may pass through the upper substrate SUB2 and be emitted to the outside (i.e., in the third direction DR3). The third incident light L3 that is not converted by the wavelength conversion particle QD may be blocked by the third color filter CF3.

The filler AL and the wavelength conversion particle QD may not be disposed to overlap the first pixel PX1 and the second pixel PX2 in a plan view. Therefore, the first incident light L1 and the second incident light L2 may not be absorbed by the wavelength conversion particles QD.

Accordingly, the first incident light L1 and the second incident light L2 may reach the color filter layer CF without changing the wavelength.

Figure 3:
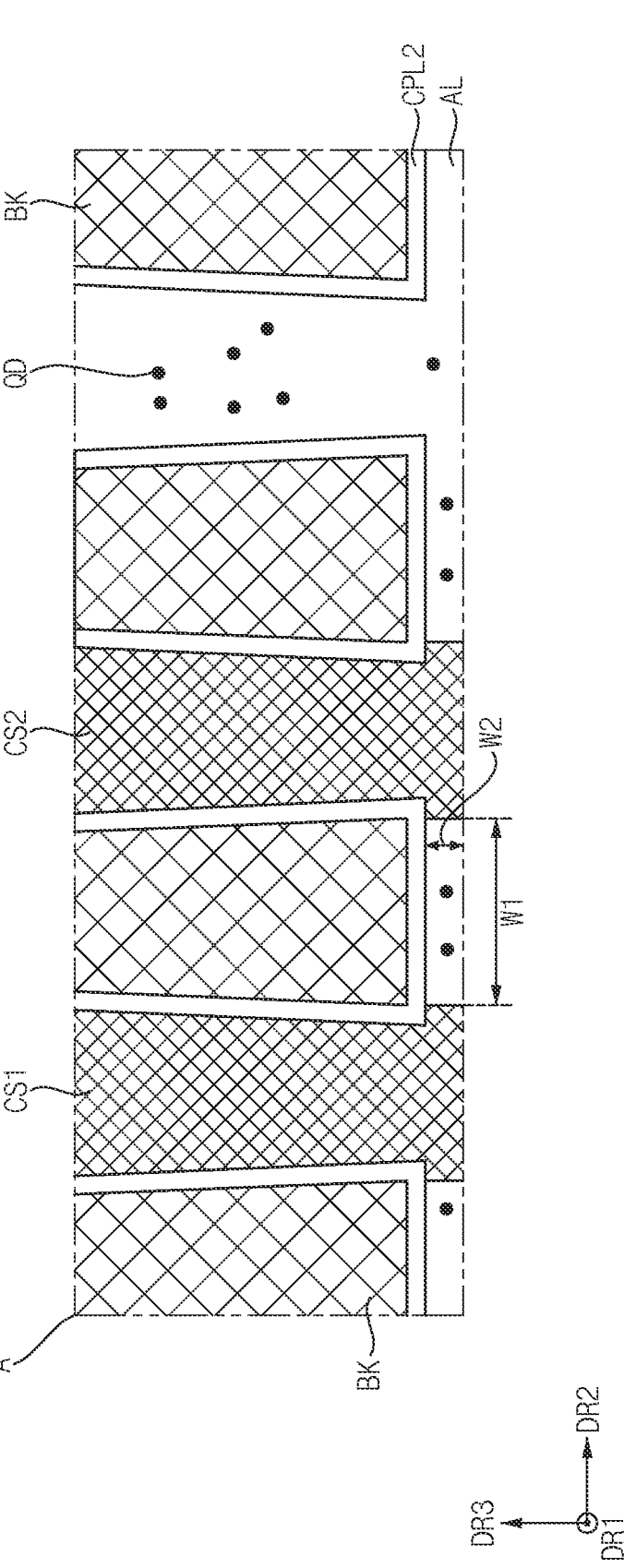
FIG. 3 is a schematic cross-sectional view of area A of FIG. 2 according to an embodiment.

FIGS. 3 and 4 are schematic cross-sectional views of area A of FIG. 2.

Referring to FIGS. 2, 3, and 4, lower surfaces of the first column spacer CS1 and the second column spacer CS2 may be formed to be lower than a lower surface of the bank layer BK in a cross-sectional view. For example, a width W2 of the first column spacer CS1 and the second column spacer CS2 exceeding a width of the bank layer BK in the third direction DR3 may not be zero.

In an embodiment, the first column spacer CS1 and the second column spacer CS2 may be connected to each other. For example, the separation distance W1 between the first column spacer CS1 and the second column spacer CS2 at the lower portion of the bank layer BK in the second direction DR2 may be zero.

FIG. 5 is a schematic cross-sectional view illustrating a display device according to another embodiment.

In describing the display device DD' of FIG. 5, substantially the same components as the display device DD of FIG. 2 are denoted by the same reference numerals, and a detailed description thereof may be omitted.

Referring to FIG. 5, a display device DD' according to another embodiment may include a display unit 100, a color filter unit 200, and a filler AL.

A display unit 100 may include a lower substrate SUB1, a buffer layer BUF, an insulating layer IL, a pixel defining layer PDL, an encapsulation layer TFE, a first capping layer CPL1, a second capping layer CPL2, a bank layer BK, a first column spacer CS1, a second column spacer CS2, a first pixel electrode PE1, a first light emitting layer EML1, a first common electrode CE1, a second pixel electrode PE2, a second light emitting layer EML2, a second common electrode CE2, a third pixel electrode PE3, a third light emitting layer EML3, a third common electrode CE3, a first transistor TR1, a second transistor TR2, and a third transistor TR3.

A buffer layer BUF may be disposed on the lower substrate SUB1. The buffer layer BUF may prevent metal atoms or impurities from being diffused from the lower substrate SUB1 to the first, second, and third transistors TR1, TR2, TR3. The buffer layer BUF may improve the flatness of the surface of the lower substrate SUB1 in case that the surface of the lower substrate SUB1 is not uniform.

The first to third transistors TR1, TR2, TR3 may be disposed on the buffer layer BUF. For example, the first to third transistors TR1, TR2, TR3 may include polycrystalline silicon or a metal oxide semiconductor.

An insulating layer IL may be disposed on the buffer layer BUF. The insulating layer IL may cover the first to third transistors TR1, TR2, TR3.

A first pixel electrode PE1, a second pixel electrode PE2, and a third pixel electrode PE3 may be disposed in the first to third pixels PX1, PX2, PX3 on the insulating layer IL, respectively. The first to third pixel electrodes PE1, PE2, PE3 may be connected to the first to third transistors TR1, TR2, TR3 respectively through contact holes formed by removing a portion of the insulating layer IL.

A pixel defining layer PLD may be disposed in the non-light emitting area NLA on the insulating layer IL and the first to third pixel electrodes PE1, PE2, PE3. The pixel defining layer PLD may cover both sides of the first to third pixel electrodes PE1, PE2, PE3 and may expose top surfaces of the first to third pixel electrodes PE1, PE2, PE3.

First to third light emitting layers EML1, EM2, EML3 may be disposed in the first to third pixels PX1, PX2, PX3 on the first to third pixel electrodes PE1, PE2, PE3 respectively. For example, holes provided by the first to third pixel electrodes PE1, PE2, PE3 and electrons provided by the first to third common electrodes CE1, CE2, CE3 may combine in the first to third light emitting layers EML1, EML2, EML3 to form excitons, and the excitons may change from excited state to ground state to emit light. In an embodiment, the first to third light emitting elements EML1, EM2, EML3 may emit green light. In an embodiment, the first to third light emitting elements EML1, EM2, EML3 may emit blue light. In an embodiment, the first to third light emitting elements EML1, EM2, EML3 may emit green light and blue light.

First to third common electrodes CE1, CE2, CE3 may be disposed on the first to third light emitting layers EML1, EML2, EML3 and the pixel defining layer PDL. For example, the first to third common electrodes CE1, CE2, CE3 may operate as cathodes.

The first pixel electrode PE1, the first light emitting layer EML1, and the first common electrode CE1 may constitute a first light emitting element LED1. The second pixel electrode PE2, the second light emitting layer EML2, and the second common electrode CE2 may constitute the second light emitting element LED2. The third pixel electrode PE3, the third light emitting layer EML3, and the third common electrode CE3 may constitute a third light emitting element LED3.

An encapsulation layer TFE may be disposed on the first to third common electrodes CE1, CE2, CE3. The encapsulation layer TFE may prevent impurities, moisture, and the like from penetrating into the first to third light emitting elements LED1, LED2, LED3 from the outside.

A first capping layer CPL1 may be disposed on the encapsulation layer TFE. A bank layer BK may be disposed on the first capping layer CPL1. The bank layer BK may include a first opening, a second opening, and a third opening overlapping the first pixel PX1, the second pixel PX2, and the third pixel PX3 in a plan view, respectively. For example, the bank layer BK entirely overlaps the non-light emitting area NLA and may have a matrix shape in a plan view.

A first column spacer CS1 may fill the first opening. For example, the first column spacer CS1 may be disposed at a portion overlapping the first pixel PX1 on the first capping layer CPL1 in a plan view.

A second column spacer CS2 may fill the second opening. For example, the second column spacer CS2 may be disposed at a portion overlapping the second pixel PX2 on the first capping layer CPL1 in a plan view.

The second capping layer CPL2 may cover an upper surface of the bank layer BK and sidewalls of the first opening, the second opening, and the third opening.

A color filter unit 200 may include an upper substrate SUB2, a low refractive layer LR, and a color filter layer CF including a first color filter CF1, a second color filter CF2, and a third color filter CF3.

A color filter layer CF may be disposed under a lower surface of the upper substrate SUB2. The color filter layer CF may include a first color filter CF1, a second color filter CF2, and a third color filter CF3.

In an embodiment, the first color filter CF1 may overlap the first pixel PX1 and may selectively transmit blue light. The second color filter CF2 may overlap the second pixel PX2 and may selectively transmit green light. The third color filter CF3 may overlap the third pixel PX3 and may selectively transmit red light. However, the disclosure is not limited thereto. For example, the first color filter CF1 may selectively transmit green light. The second color filter CF2 may selectively transmit blue light. The third color filter CF3 may selectively transmit red light.

In an embodiment, each of the first color filter CF1, the second color filter CF2, and the third color filter CF3 may be disposed in the non-light emitting area NLA. For example, as illustrated in FIG. 5, the first color filter CF1 may overlap the first pixel PX1 and the non-light emitting area NLA, and may not overlap the second and third pixels PX2, PX3 in a plan view. The second color filter CF2 may overlap the second pixel PX2 and the non-light emitting area NLA, and may not overlap the first and third pixels PX1, PX3 in a plan view. The third color filter CF3 may overlap the third pixel PX3 and the non-light emitting area NLA, and may not overlap the first and second pixels PX1, PX2 in a plan view.

Portions of the first color filter CF1, the second color filter CF2, and the third color filter CF3 may overlap with each other in the third direction DR3 in the non-light emitting area NLA. Accordingly, color mixing between the adjacent first to third pixels PX1, PX2, PX3 may be prevented.

In an embodiment, each of the first color filter CF1 and the second color filter CF2 may include a scattering element. The scattering element may increase light path by scattering the first and second incident light L1, L2 incident on the first color filter CF1 and the second color filter CF2, respectively, without substantially changing wavelengths of the first and second incident light L1, L2.

In an embodiment, the scattering element may include a metal oxide or an organic material. In an embodiment, the scattering element may include titanium dioxide ($TiO_2$).

A low refractive layer LR may be disposed under the color filter layer CF. The low refractive layer LR may increase the luminance and life of the display device DD' by improving light extraction efficiency.

A filler AL may be disposed between the display unit 100 and the color filter unit 200. For example, the filler AL may serve to bond the display unit 100 and the color filter unit 200. In an embodiment, the filler AL may fill the third opening. For example, the filler AL may not fill the first opening and the second opening.

The first column spacer CS1 and the second column spacer CS2 may have a width greater than a width of the bank layer BK in the third direction. Accordingly, the filler AL may be disposed on the bank layer BK.

The filler AL may include a wavelength conversion particle QD. The wavelength conversion particle QD may be disposed in the filler AL. The wavelength conversion particle QD may include a quantum dot. The quantum dot may absorb the third incident light L3 and emit light having a wavelength different from the wavelength of the third incident light L3. In an embodiment, the wavelength conversion particle QD may absorb the third incident light L3 to emit red light.

The red light emitted from the wavelength conversion particle QD may pass through the upper substrate SUB2 and be emitted to the outside (i.e., in the third direction DR3). The third incident light L3 that is not converted by the wavelength conversion particle QD may be blocked by the third color filter CF3.

The filler AL and the wavelength conversion particle QD may not be disposed to overlap the first pixel PX1 and the second pixel PX2 in a plan view. Therefore, the first incident light L1 and the second incident light L2 may not be absorbed by the wavelength conversion particles QD. Accordingly, the first incident light L1 and the second incident light L2 may reach the color filter layer CF without changing the wavelength.

Figure 6:
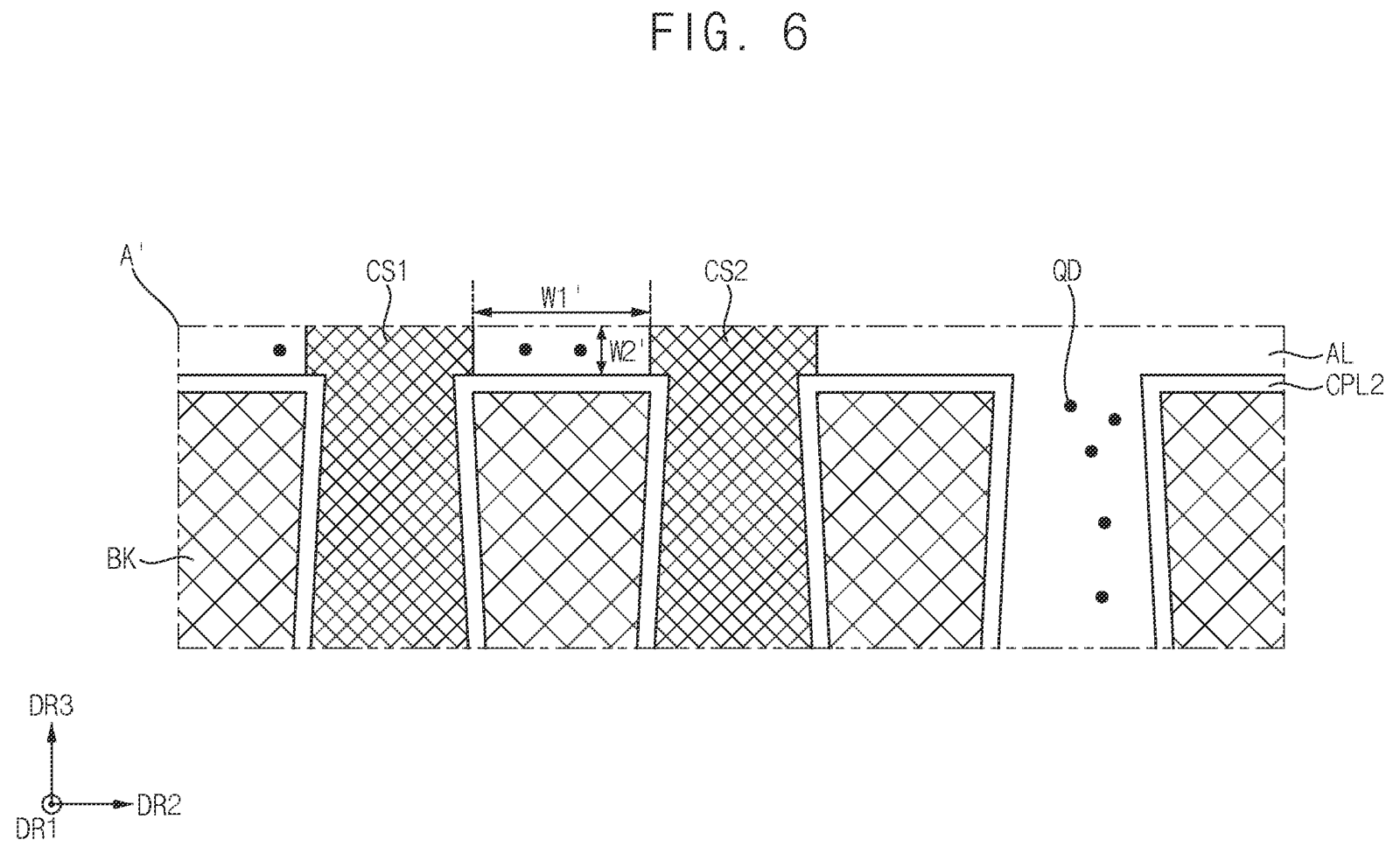

FIGS. 6 and 7 are schematic cross-sectional views of region A' of FIG. 5.

Referring to FIGS. 5, 6, and 7, upper surfaces of the first column spacer CS1 and the second column spacer CS2 may be formed higher than an upper surface of the bank layer BK in a cross-sectional view. For example, a width W2' of the first column spacer CS1 and the second column spacer CS2 exceeding a width of the bank layer BK in the third direction DR3 may not be zero.

In an embodiment, the first column spacer CS1 and the second column spacer CS2 may be connected to each other. For example, a separation distance W1' between the first column spacer CS1 and the second column spacer CS2 at an upper portion of the bank layer BK in the second direction DR2 may be zero.

The disclosure can be applied to various display devices. For example, the disclosure may be applicable to various display devices such as display devices for vehicles, ships, and aircraft, portable communication devices, display devices for exhibition or information transmission, medical display devices, and the like.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
a display unit including a lower substrate and a first light emitting element, a second light emitting element, and a third light emitting element disposed on the lower substrate;
a color filter unit including an upper substrate having a lower surface facing the first, second, and third light emitting elements; and
a filler disposed between the display unit and the color filter unit and including a wavelength conversion particle,
wherein the color filter unit further includes:
a color filter layer including a first color filter, a second color filter, and a third color filter disposed on the lower surface of the upper substrate;
a bank layer disposed below the color filter layer and including a first opening,
a second opening, and a third opening;
a first column spacer filling the first opening; and
a second column spacer filling the second opening.

2. The display device of claim 1, wherein the wavelength conversion particle includes quantum dots emitting first color light.

3. The display device of claim 2, wherein the first color light is red light.

4. The display device of claim 1, wherein the filler fills the third opening.

5. The display device of claim 1, wherein a lower surface of the first column spacer and a lower surface of the second column spacer are formed lower than a lower surface of the bank layer.

6. The display device of claim 5, wherein the first column spacer and the second column spacer are connected to each other.

7. The display device of claim 1, wherein the first color filter and the second color filter include a scattering element.

8. The display device of claim 1, further comprising:
a low refractive layer disposed between the color filter layer and the bank layer, the first column spacer, the second column spacer, and the filler.

9. The display device of claim 8, further comprising:
a first capping layer disposed between the low refractive layer and the bank layer, the first column spacer, the second column spacer, and the filler.

10. The display device of claim 9, further comprising:
a second capping layer covering a lower surface of the bank layer and sidewalls of the first opening, the second opening, and the third opening.

11. The display device of claim 1, wherein each of the first column spacer and the second column spacer includes a liquid repellent component.

12. A display device comprising:
a display unit including a lower substrate and a first light emitting element, a second light emitting element, and a third light emitting element disposed on the lower substrate;
a color filter unit including an upper substrate having a lower surface facing the first, second, and third light emitting elements; and
a filler disposed between the display unit and the color filter unit and including a wavelength conversion particle, wherein
the display unit further includes:
a bank layer disposed on the first, second, and third light emitting elements and including a first opening, a second opening, and a third opening;

a first column spacer filling the first opening; and
a second column spacer filling the second opening, and
the color filter unit further includes a color filter layer including a first color filter, a second color filter, and a third color filter disposed on the lower surface of the upper substrate.

13. The display device of claim 12, wherein the wavelength conversion particle includes quantum dots emitting first color light.

14. The display device of claim 13, wherein the first color light is red light.

15. The display device of claim 12, wherein the filler fills the third opening.

16. The display device of claim 12, wherein an upper surface of the first column spacer and an upper surface of the second column spacer are formed higher than an upper surface of the bank layer.

17. The display device of claim 16, wherein the first column spacer and the second column spacer are connected to each other.

18. The display device of claim 12, further comprising:
an encapsulation layer disposed between the bank layer and the first to third light emitting elements, the first column spacer, the second column spacer, and the filler.

19. The display device of claim 18, further comprising:
a first capping layer disposed between the encapsulation layer and the bank layer, the first column spacer, the second column spacer, and the filler.

20. The display device of claim 19, further comprising:
a second capping layer covering an upper surface of the bank layer and sidewalls of the first opening, the second opening, and the third opening.

* * * * *